United States Patent
Krstic et al.

(10) Patent No.: US 10,988,161 B2
(45) Date of Patent: Apr. 27, 2021

(54) STEERING INPUT SYSTEM FOR A VEHICLE

(71) Applicant: Volvo Car Corporation, Gothenburg (SE)

(72) Inventors: Daniel Krstic, Gothenburg (SE); Johan Svensson, Mölnlycke (SE); Victor Wetterlind, Gothenburg (SE)

(73) Assignee: Volvo Car Corporation, Göteborg (SE)

( * ) Notice: Subject to any disclaimer, the term of this patent is extended or adjusted under 35 U.S.C. 154(b) by 83 days.

(21) Appl. No.: 16/445,298

(22) Filed: Jun. 19, 2019

(65) Prior Publication Data

US 2020/0023882 A1    Jan. 23, 2020

(30) Foreign Application Priority Data

Jul. 18, 2018 (EP) .................................. 18184099

(51) Int. Cl.
   *B62D 1/183* (2006.01)
   *B62D 1/189* (2006.01)
   *B62D 1/19* (2006.01)
   *B62D 1/181* (2006.01)

(52) U.S. Cl.
   CPC ............. *B62D 1/183* (2013.01); *B62D 1/181* (2013.01); *B62D 1/189* (2013.01); *B62D 1/192* (2013.01)

(58) Field of Classification Search
   CPC ........ B62D 1/181; B62D 1/183; B62D 1/189; B62D 1/192
   See application file for complete search history.

(56) References Cited

U.S. PATENT DOCUMENTS

| | | | | |
|---|---|---|---|---|
| RE31,646 E | * | 8/1984 | Beals ...................... | B60K 37/00 180/78 |
| 5,393,094 A | * | 2/1995 | Wardavoir ............. | B62D 1/183 280/775 |
| 7,455,319 B2 | * | 11/2008 | Haglund ................ | B62D 1/181 280/775 |
| 7,584,996 B2 | * | 9/2009 | Cartwright ............ | B62D 1/183 280/775 |
| 7,677,370 B2 | * | 3/2010 | Battlogg ................ | B62D 1/192 188/267.2 |
| 7,806,224 B2 | * | 10/2010 | Maeda ................... | B62D 1/181 180/334 |
| 8,726,757 B2 | * | 5/2014 | Barroso ................. | B62D 1/187 74/493 |

(Continued)

FOREIGN PATENT DOCUMENTS

| | | |
|---|---|---|
| CN | 206067855 U | 4/2017 |
| JP | 2017165320 A | 9/2017 |
| WO | 03020572 A1 | 3/2003 |

OTHER PUBLICATIONS

Jan. 22, 2019 European Search Report issue on International Application No. EP18184099.

*Primary Examiner* — Laura Freedman
(74) *Attorney, Agent, or Firm* — Clements Bernard Walker; Christopher L. Bernard

(57) ABSTRACT

A steering input system for a vehicle, the system including: a steering input device configured to provide a steering action input for the vehicle, and an actuator assembly including a set of actuators configured to translate the steering input device from a drive position to a retracted position by a combined actuation action.

20 Claims, 4 Drawing Sheets

(56) References Cited

U.S. PATENT DOCUMENTS

| | | | |
|---|---|---|---|
| 9,126,625 B2* | 9/2015 | Battlogg | B60N 2/0276 |
| 10,661,820 B2* | 5/2020 | Gacsal | B62D 1/184 |
| 2014/0260761 A1 | 9/2014 | Soderlind | |
| 2016/0200344 A1 | 7/2016 | Sugioka et al. | |
| 2016/0375860 A1 | 12/2016 | Lubischer et al. | |
| 2018/0037248 A1 | 2/2018 | Schwarz et al. | |

* cited by examiner

STEERING INPUT SYSTEM FOR A VEHICLE

CROSS-REFERENCE TO RELATED APPLICATION

The present disclosure claims the benefit of priority of co-pending European Patent Application No. 18184099.2, filed on Jul. 18, 2018, and entitled "A STEERING INPUT SYSTEM FOR A VEHICLE," the contents of which are incorporated in full by reference herein.

TECHNICAL FIELD

The present disclosure relates to steering input system for a vehicle and to a vehicle including such a steering input system.

BACKGROUND

Future fully autonomous vehicles will probably be used to transport one or several occupant on longer trips—to some extent replacing trains and airplanes. In such and other situations, it is likely that the occupants want to spend their travelling time relaxing or working.

However, although fully autonomous vehicles will mostly be driving without the need for human interference, there may still be situations where it may be necessary for a human driver to take control of the vehicle. Thus, the vehicles may have two modes, a fully autonomous mode and a manual mode.

In the manual mode it is important that the driver can easily access the steering wheel of the vehicle in order to be able to safely operate the vehicle. Thus, the steering wheel has to be positioned in a convenient location relative the driver.

In the autonomous mode, the driver does no longer need access to the steering wheel. Instead, the driver may prefer to engage in other activities during the travel. In such case, the traditional steering wheel position will likely be annoying and in the way for the occupant in the driver's seat. Thus, it may be advantageous if the steering wheel may be moved away from the usage position.

US2018/037248 discloses an example of a steering wheel which may be pivoted or tilted away from a usage position into a rest position. The rim of the steering wheel in US2018/037248 is pivotably or tiltably attached to a stationary spoke of the steering wheel such that the steering wheel rim can be rotated into the rest position.

Although the solution disclosed in US2018/037248 provides for moving the steering wheel to a different location when driving in the autonomous mode, there is still room for improvements with regards to allowing more space for the driver in the autonomous mode.

SUMMARY

In view of above, it is an object of the present disclosure to provide a steering input system which can allow for increased space for the driver when steering is not necessary.

According to a first aspect of the disclosure, there is provided an a steering input system for a vehicle, the system including: a steering input device configured to provide a steering action input for the vehicle, an actuator assembly including a set of actuators, wherein a tilt actuator coupled to the steering input device is configured to provide a tilt motion for the steering input device about a generally horizontal rotation axis, wherein a first positioning actuator coupled to the steering input device via a first linkage arm is configured to provide a rotating motion for the steering input device about a first rotation axis, and a second positioning actuator coupled to the steering input device via a second linkage arm is configured to provide a rotating motion for the steering input device about a second rotation axis spatially separated from the first rotation axis, wherein the first positioning actuator and the second positioning actuator are configured to translate the steering input device from a drive position to a retracted position by a combined actuation action.

The present disclosure is based on the realization to allow a tilting motion of the steering input device and a retracting motion in an axial direction towards the dashboard of the vehicle. It was further realized to combine the actuation of three actuators suitably configured with respect to each other to enable both the tilting motion and the retracting motion.

With the inventive concept, a larger degree of freedom for moving the steering input device is possible compared to prior art solutions. In particular, the various embodiments and possible implementations provides for improved ways of moving the steering input device to various positions, allowing for flexibility in configuring the steering input device for manual driving and for moving the steering input device away from the driver.

An actuator may be a device able to expand its longitudinal length in one direction such as to cause a force on a linkage arm. Examples of actuators include electric actuators which are able to convert electric energy into mechanical torque. The actuators may be linear actuators which create a motion along a single axis.

The steering input device is accessible to the driver such that the driver may provide steering action input the steering input system by causing the steering input device to rotate.

In the drive position of the steering input device the driver may easily reach the steering input device for manual control of the vehicle.

In the retracted position of the steering input device the driver has more space accessible for other activities than driving due to that the steering input device is further away from the driver.

The first rotation axis and the second rotation axis are spatially separated from each other. Thereby, the degrees of freedom for moving the steering input device is largely increased which advantageously increases the possibilities for arranging the steering input device in various positions.

The first linkage arm is pivotally coupled to a third linkage arm coupled to the steering input device. Thus, the first positioning actuator may be coupled to the first linkage arm, whereby the first linkage arm is pivotally coupled to the third linkage arm which is coupled to the steering input device.

The second rotation axis may coincide with the pivotal connection between the first linkage arm and the third linkage arm.

Furthermore, the third linkage arm may be arranged generally parallel with the second linkage arm.

The first positioning actuator may be connected to the first linkage arm a distance away from the pivotal connection between the first linkage arm and the third linkage arm. This advantageously provides for separating the rotation axes in space. However, the rotation axis may be parallel due to the parallel arrangement of the first and second linkage arms.

The steering input system may include a fourth linkage arm, wherein a first end portion of the fourth linkage arm is connected to the second linkage arm at the second rotation axis, wherein the second positioning actuator is connected to the second linkage arm at a first end portion of the second positioning actuator, wherein the second end portion of the second positioning actuator is connected to a second end portion of the fourth linkage arm.

The steering input device may be rotatable about a third rotation axis provided by a pivotal connection between the second end portion of the fourth linkage arm and a vehicle structure. The vehicle structure may for example be the dashboard carrier of the vehicle. The ability to rotate about the third rotation axis opens up for even further ways of moving the steering input device.

The steering input device may be coupled to a spindle which is connected to a steering feedback system via a pivotal connection. The feedback system is part of a steer-by-wire solution that generates torque feedback to the driver via the steering wheel. Feedback to the driver is needed to simulate the feel of a mechanical connection between the steering wheel and the steering gear in steer-by-wire steering systems. The feedback system is also configured to receive a signal indicative of the absolute angle of the steering wheel caused by from the steering wheel rotation input from the driver. The feedback system sends the signal to the steering gear to maneuver the vehicle.

The spindle may include an energy absorptions unit configured to absorb energy in the event of a vehicle collision. Thus, the energy absorptions unit advantageously provides for improved safety for the driver.

The energy absorptions unit may include a magnetorheological fluid-damper. A magnetorheological fluid is adapted to change viscosity with magnetic field. In the event of a vehicle collision, a magnetic field is applied to the magnetorheological fluid such that its viscosity is increased and the damper is harder to compress.

The steering input device may be rotatably connected to the actuator assembly such that the steering input device is rotatable with respect to the actuator assembly for providing steering input to the steering input system by a driver. The rotation is provided by a bearing configuration arranged on a back side of the steering input device.

Furthermore, the steering input system may include a control unit configured to receive input signals indicative of a desired position of the steering input device, and to control the actuators to reposition the steering input device according to the input signals. The input signals may be received by input from the driver on the dashboard. For example, the driver may be manually driving the vehicle but wishes to transition the vehicle to autonomous mode. When autonomous mode has been selected, the steering input device may be controlled by the control unit to retract away from the driver into the retracted position.

According to a second aspect of the disclosure, there is provided a vehicle including the steering input system.

The vehicle is preferably possible to operate in an autonomous mode. Thus, the vehicle may be an autonomous vehicle.

This second aspect of the disclosure provides similar advantages as discussed above in relation to the previous aspect of the disclosure.

In summary, the present disclosure relates to a steering input system for a vehicle, the system including: a steering input device configured to provide a steering action input for the vehicle, and an actuator assembly including a set of actuators configured to translate the steering input device from a drive position to a retracted position by a combined actuation action.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

These and other aspects of the present disclosure will now be described in more detail, with reference to the appended drawings showing example embodiments of the disclosure, wherein.

DESCRIPTION OF EMBODIMENTS

Figure 1A:
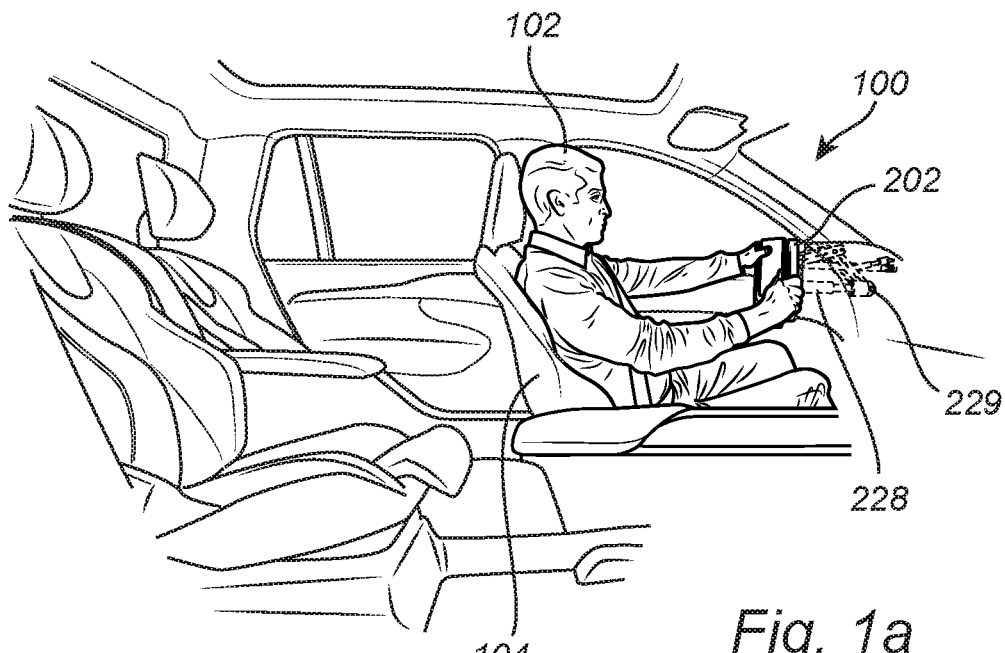
FIG. 1a conceptually illustrates application of embodiments of the disclosure.

In the present detailed description, various embodiments of the system and method according to the present disclosure are mainly described with reference to a vehicle in form of a car. However, the present disclosure is equally well applicable to other vehicles such as trucks, busses, etc. Thus, this disclosure may generally be embodied in many different forms and should not be construed as limited to the embodiments set forth herein; rather, these embodiments are provided for thoroughness and completeness, and fully convey the scope of the disclosure to the skilled person. Like reference characters refer to like elements throughout.

FIG. 1a conceptually illustrates a driver 102 positioned in the driver's seat 104 of a vehicle in the form of a car 100. The car 100 may be an autonomous car operable in an autonomous mode and in a manual mode. In FIG. 1a the car 100 is operated in a manual mode in which the car 100 is driven manually by the driver 102. In this manual mode the driver 102 needs full access to the steering input device 202, i.e. the steering wheel 202. Therefore, the steering input device 202 is here shown in a drive position easily accessible to the driver 102 in the manual mode of the car 100.

The steering input device 202 is configured to provide a steering input action to the car 100 from the driver 102. In other words, the driver 102 may for instance turn the steering input device 202 in order to steer the car 100.

The steering input device 202 is coupled to a spindle 228 which is connected to a steering feedback system via a pivotal connection 229. The pivotal connection 229 enables the steering input device 202 to be translated in an up/down and left/right direction but maintain the steering control for the driver. The steering input device may be withdrawn away from the driver 104.

The spindle 228 transfers torque from the steering input device 202 to the steering feedback system. The steering feedback system may include electric motors for controlling the steering angle of the wheels of the vehicle 100. The steering system may be a steer-by-wire system in which turning the wheels of the car is actuated by electric motors controlled by vehicle control units.

The steering input system of the present disclosure may also be implemented with a traditional rack and pinion steering mechanism known per se to the skilled person.

In the autonomous mode where no or little input is needed from the driver 102 for controlling e.g. the steering of the car, the driver has less need for the steering input device 202. Instead, the driver may spend the travelling time in the car reading or working.

Figure 1B:
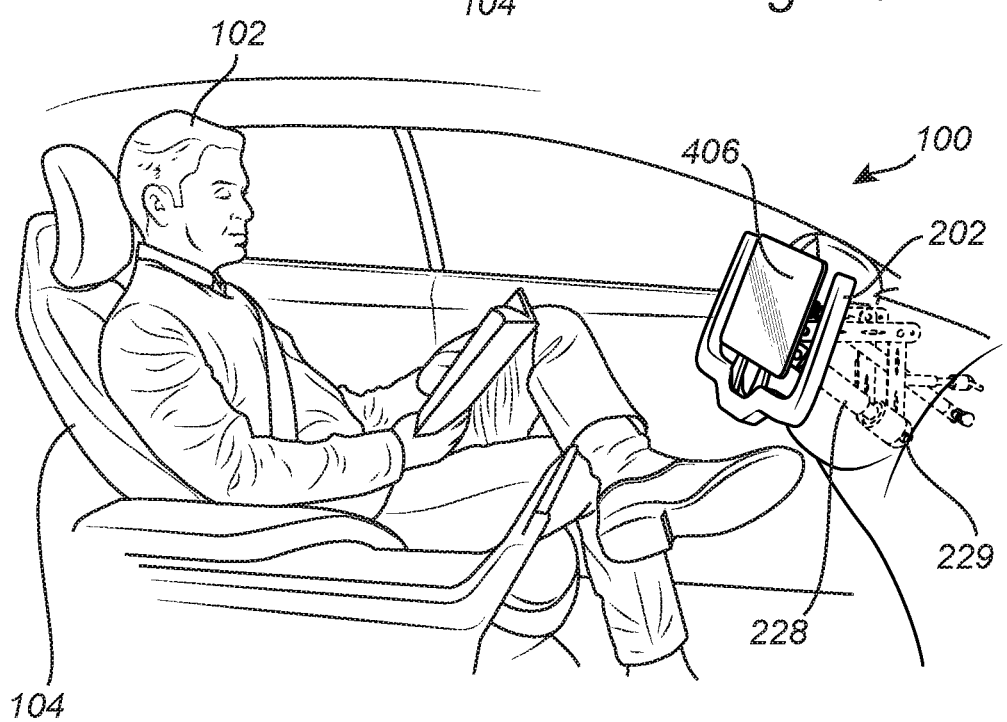
FIG. 1b conceptually illustrates application of embodiments of the disclosure.

FIG. 1b illustrates the driver 102 in the driver's seat 104 of the car 100 in the autonomous mode. In the autonomous mode the steering input device 202 is advantageously further away from the driver than in the manual driving mode of the car. The steering input device 202 is therefore here shown in a retracted position which allows more space for the driver than in the manual mode with the steering input device 202 in the drive position. The steering input device 202 has been withdrawn away from the driver by a set of actuators and linking arms which will be described next.

Figure 2:
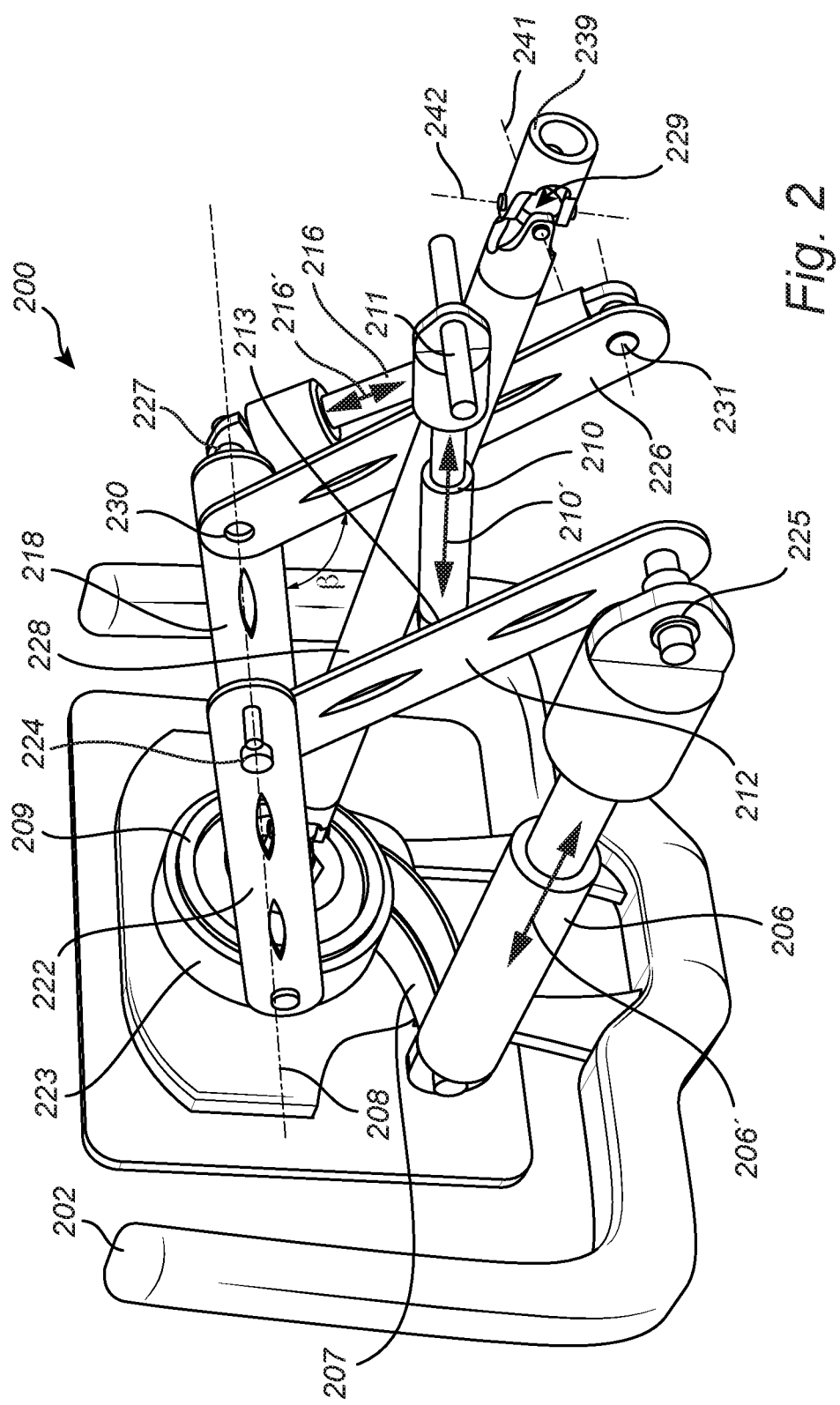
FIG. 2 schematically illustrates an a steering input system according to an exemplary embodiment.

FIG. 2 illustrates a steering input system 200 according to embodiments of the disclosure. The steering input system 200 includes the steering input device 202 also shown in FIGS. 1a-b. The steering input device 202 is configured to provide a steering action input for the vehicle such that the driver may steer the vehicle, in other words the steering input device may be a steering wheel.

An actuator assembly of the steering input system 200 includes a set of actuators. A first actuator is a tilt actuator 206 which is pivotally coupled to the steering input device 202 via a tilt mechanism 207. The tilt actuator 206 may expand or contract in the direction indicated by the arrow 206' which causes the steering input device 202 to rotate about an axis 208 such that the steering input device 202 can be tilted. The axis 208 is a horizontal axis near the steering input device 202.

The spindle 228 and the linkage arms 218 and 222 are pivotally connected to the steering input device 202 at the connection assembly 223 to allow for the tilt rotation of the steering input device 202. The tilt mechanism 207 is part of a connection assembly 223 which includes a bearing 209 which allows for the rotation of the steering input device 202 when the driver provides steering input, without rotating the tilt mechanism 207.

The pivotal connection 229 between the spindle and a joint part 239 connected to the steering feedback system (not shown) transfers rotational torque from the spindle 228 to the steering system of the vehicle connected to the joint part 239. The pivotal connection 229 allows for rotation about the two axes 241 and 242 but not axial rotation of the spindle 228 with respect to the joint part 239.

A first positioning actuator 210 is coupled to the steering input device 202 via at least a first linkage arm 212. The first positioning actuator 210 is connected at one of its ends to the first linkage arm 212 via a rotational connection 213 better seen in FIG. 3. Furthermore, the first positioning actuator 210 is pivotally connected at its other end to an axle 211 which is fixedly connected to vehicle parts behind the dashboard of the vehicle.

In the presently illustrated embodiment the first linkage arm 212 is pivotally connected at one of its ends to a third linkage arm 222 via pivotal connection 224. The first linkage arm 212 is pivotally connected at its other end to a vehicle structure behind the dashboard at pivotal connection 225 which is shared with the tilt actuator 206. The third linkage arm 222 is pivotally connected at one of its ends to the connection assembly 223 of the steering input device 202.

The first positioning actuator 210 may be expanded or contracted in the directions indicated by the arrow 210'. In other words, when the first positioning actuator is expanded it causes the first linkage arm to push the third linkage arm 222 forward which causes the steering input device 202 to be pushed towards the driver, as will be described with reference to FIG. 3.

Figure 3:
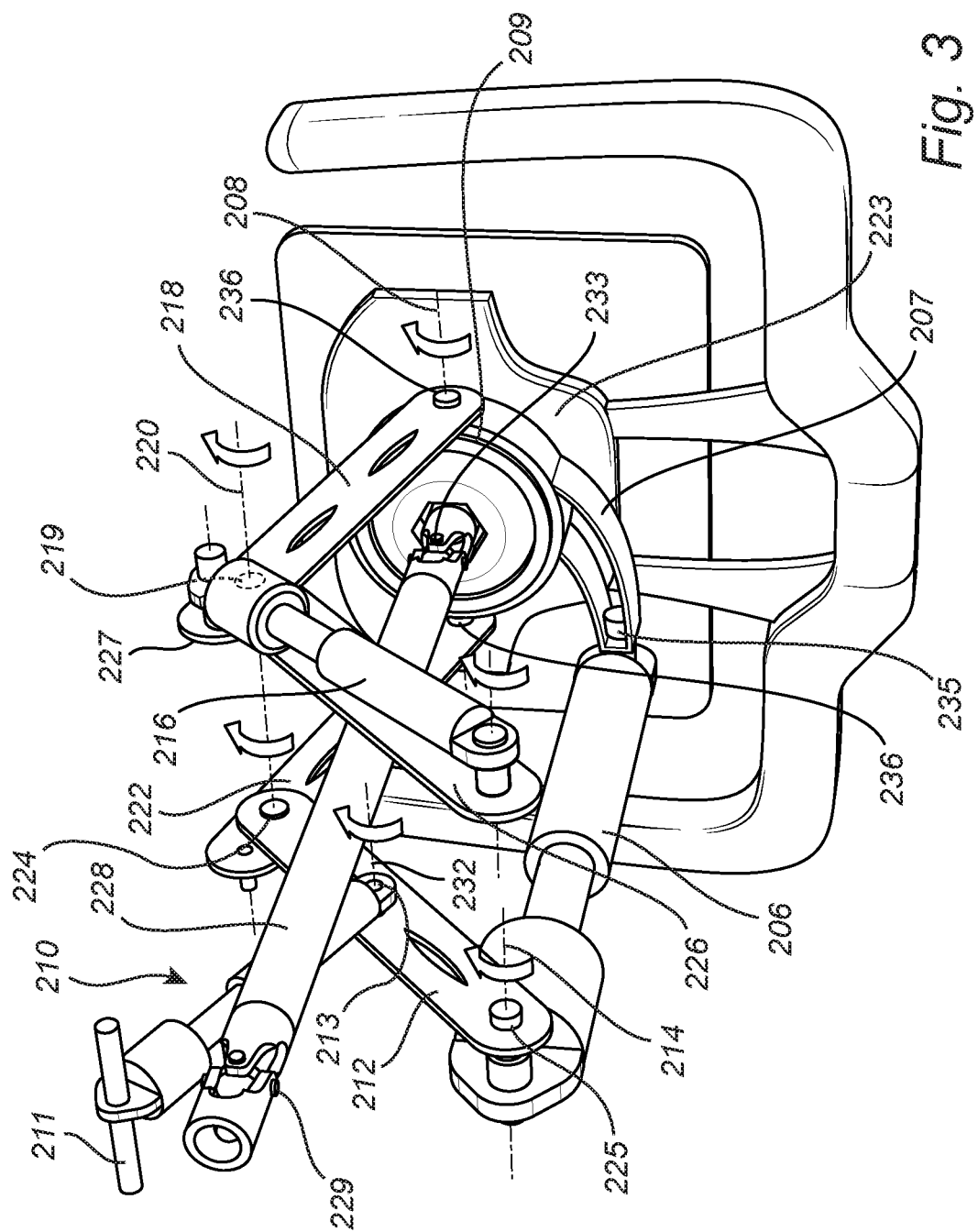
FIG. 3 schematically illustrates an a steering input system according to an exemplary embodiment.

A second positioning actuator 216, better seen in FIG. 3, is coupled to the steering input device 202 via a second linkage arm 218. The second positioning actuator 216 may be expanded or contracted in the directions indicated by the arrow 216' which causes the angle β between the linkage arms 218 and 226 to vary. The second positioning actuator 216 is pivotally connected to the second linkage arm 218 at pivotal connection 227. The second linkage arm 218 is pivotally connected to a fourth linkage arm 226 at pivotal connection 230. The fourth linkage arm 226 and the second positioning actuator 216 are pivotally connected to an axle 231 (only partly shown) which is fixedly connected to vehicle parts behind the dashboard of the vehicle.

The spindle 228 may include an energy absorptions unit configured to absorb energy in the event of a vehicle collision. Thus, the energy absorptions unit advantageously provides for improved safety for the driver.

The energy absorptions unit may include a magnetorheological fluid-damper. A magnetorheological fluid is adapted to change viscosity with magnetic field. In the event of a vehicle collision, a magnetic field is applied to the magnetorheological fluid such that its viscosity is increased and the damper is harder to compress.

FIG. 3 illustrates the steering input system 200 with indicated rotation axes for the system 200.

Firstly, the tilt actuator 206 may cause a tilt rotation for the steering input device about the generally horizontal axis 208, which was also described with reference to FIG. 2. The linkage arms 222 and 218 are both pivotally connected to the connection mechanism 223 such that the steering input device 202 may be rotated with respect to both linkage arms 222 and 218 about the rotation axis 208. Accordingly, when the tilt actuator 206 is expanded or contracted the tilt actuator 206 pushes or pulls on the tilt mechanism 207 at the pivotal connection 235 between the tilt actuator 206 and the tilt mechanism 207. The pivotal connection 235 is spatially offset from the pivotal connections 236 between the linkage arms 222 and 218 and the connection mechanism 223, and also from the rotation axis 208, whereby the steering input device 202 is tilted about the rotation axis 208 by the action of the tilt actuator 206. In addition, the spindle 228 is pivotally connected to the connection mechanism 223 at pivotal connection 233. The pivotal connection 233 is identical to pivotal connection 229.

Secondly, the first positioning actuator 210 may push or pull on the first linkage arm 212 at an intermediate location on the first linkage arm 212. The intermediate location is between the end portions of the first linkage arm 212. The end portions being at the pivotal connection 225 and at the pivotal connection 224 with the linkage arm 222. The first positioning actuator 210 is spatially fixed at its pivotal connection with the axle 211 at one of the ends of the first positioning actuator 210. However, the first positioning actuator 210 may rotate about the axle 211. In addition, the pivotal connection 213 between the first positioning actuator 210 and the first linkage arm 212 allows for a rotational motion between them about axis 232.

When the first positioning actuator 210 acts on the first linkage arm 212, the steering input device 202 is rotated about the rotation axis 214. For instance if the first positioning actuator is expanded, then the steering input device 202 rotates about axis 214 in one rotational direction. On the contrary, if the first positioning actuator 210 is contracted, the steering input device 202 rotates about axis 214 in the opposite rotational direction.

Moreover, the second positioning actuator 216 is pivotally connected to the second linage arm 218, at a pivotal connection 227 offset from a pivotal connection 219 between the fourth linkage arm 226 and the second linkage arm 218. The pivotal connection 227 between the second positioning actuator 216 and the second linkage arm 218 is at an end portion of the second linkage arm 218 and the pivotal connection between the fourth linkage arm 226 and the second linkage arm 218 is at an intermediate position on the second linkage arm 218 such that part of the second linkage arm 218 forms a leverage arm for the second actuator 216.

When the second positioning actuator 216 acts on the second linkage arm 218, the steering input device 202 is rotated about the rotation axis 220 which coincides with the connection 219 between the fourth linkage arm 226 and the second linkage arm 218. For instance if the second positioning actuator 216 is expanded, then the angle β (see FIG. 2) between the second linkage arm 218 and the fourth linkage arm 226 is allowed to decrease. On the contrary, if the second positioning actuator 216 is contracted, then the angle β (see FIG. 2) between the second linkage arm 218 and the fourth linkage arm 226 is allowed to increase.

Overall, and as an example, the steering input device 202 may be translated from a drive position shown in FIG. 1a, to a retracted position shown in FIG. 1b, by the contraction of the first positioning actuator 210 and expansion of the second positioning actuator 216. Moreover, the steering input device 202 may be translated from the retracted position shown in FIG. 1b, to the drive position shown in FIG. 1a, by the expansion of the first positioning actuator 210 and contraction of the second positioning actuator 216.

Figure 4A:
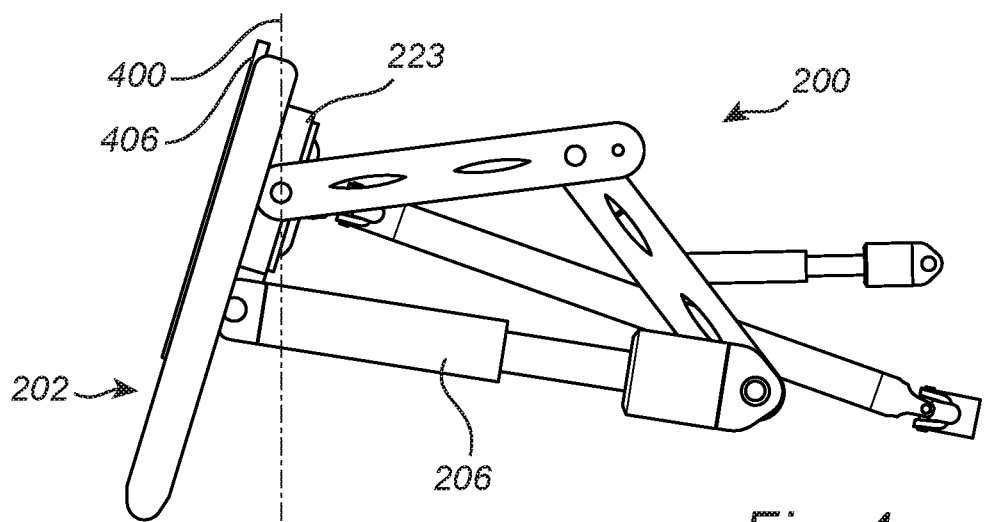
FIG. 4a schematically illustrates a tilt position for the steering input device.
Figure 4B:
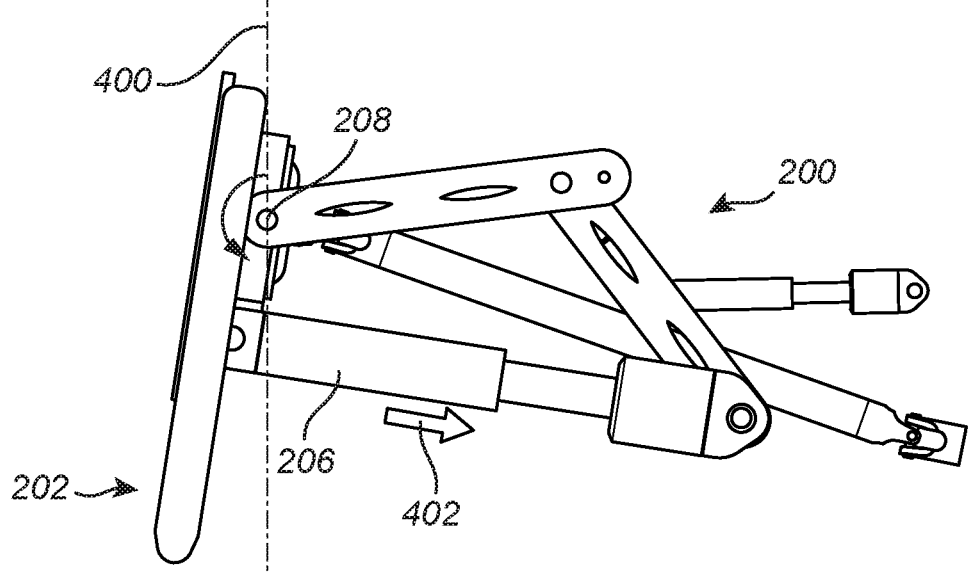
FIG. 4b schematically illustrates a further tilt position for the steering input device.
Figure 4C:
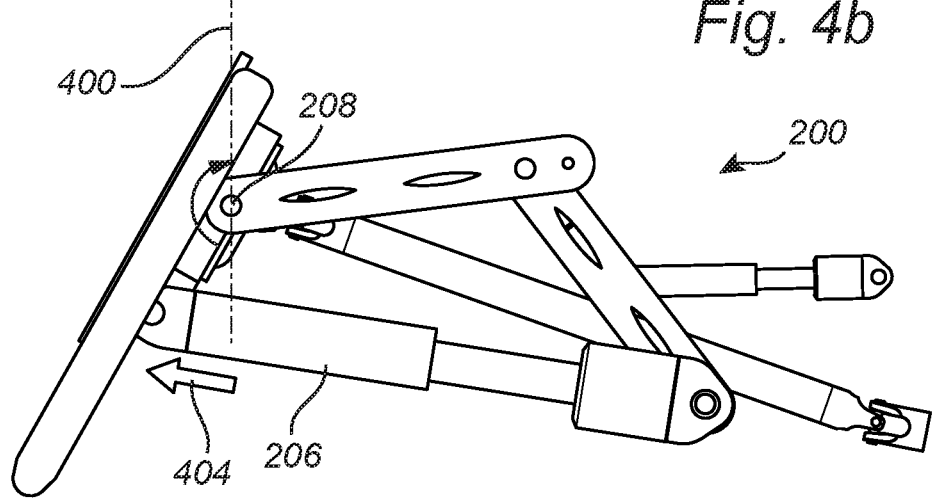
FIG. 4c schematically illustrates yet another tilt position for the steering input device.

FIG. 4a-c are a conceptual side views of the steering input system 200 shown in different tilt positions of the steering input device 202.

In FIG. 4a the steering input device is shown in an exemplary nominal position with the steering input device in a somewhat tilted position with respect to a vertical axis 400.

By the contraction of the tilt actuator 206, as conceptually exemplified in FIG. 4b and indicated by the arrow 402, the steering input device 202 is tilted to a more upright position compared to the nominal position shown in FIG. 4a less angled with respect to the vertical axis 400.

By the expansion of the tilt actuator 206, as conceptually exemplified in FIG. 4c and indicated by the arrow 404, the steering input device 202 is tilted to a less upright position compared to the nominal position shown in FIG. 4a further angled with respect to the vertical axis 400.

The steering input device may be adapted to hold a tablet or a similar electronic device 406 that the user may use in the retracted position.

The linkage arms may include a rigid material such as a metal such as steel, or hard plastics or composite materials and may be manufactured by means known in the art such as injection molding, 3D-printing, extrusion, die forming, or other metal forming techniques including and cutting and welding techniques.

The actuators of the steering input system may be linear actuators which create a force along a single axis. Several types of linear actuators are implementable, for instance hydraulic actuators, pneumatic actuators, electro-mechanical actuators, piezoelectric actuators, etc.

The steering input system may include or be connected to a vehicle control unit configured to control the actuators to position the steering input device according to received control signals. The control signals may be generated from a selection of manual mode or autonomous mode of the vehicle. For example, if the autonomous mode is selected, the vehicle control unit may receive a control signal indicative thereof, whereby the vehicle control unit controls the steering input device to transition to the retracted position. On the contrary, if the manual mode is selected, the vehicle control unit may receive a control signal indicative thereof, whereby the vehicle control unit controls the steering input device to transition to the drive position.

The vehicle control unit may include a microprocessor, microcontroller, programmable digital signal processor or another programmable device. The control functionality of the present disclosure may be implemented using existing computer processors, or by a special purpose computer processor for an appropriate system, incorporated for this or another purpose, or by a hardwire system. The vehicle control unit may communicate with electrical systems of the vehicle via e.g. CAN-buses or LIN-buses.

The person skilled in the art realizes that the present disclosure by no means is limited to the preferred embodiments described above. On the contrary, many modifications and variations are possible within the scope of the appended claims.

For instance, the steering input device may take many forms different from the depicted steering input device herein. For example, a more traditional circular or round steering wheel is equally applicable and within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A steering input system for a vehicle, the system comprising:
   a steering input device configured to provide a steering action input for the vehicle,
   an actuator assembly comprising a set of actuators comprising a tilt actuator, a first positioning actuator, and a second positioning actuator, wherein the tilt actuator is coupled to the steering input device to provide a tilt motion for the steering input device about a generally horizontal rotation axis, wherein
   the first positioning actuator is coupled to the steering input device via a first linkage arm and is configured to provide a rotating motion for the steering input device about a first rotation axis, and
   the second positioning actuator is coupled to the steering input device via a second linkage arm and is configured to provide a rotating motion for the steering input device about a second rotation axis spatially separated from the first rotation axis, wherein
   the first positioning actuator and the second positioning actuator are configured to translate the steering input device from a drive position to a retracted position by a combined actuation action.

2. The steering input system of claim 1, wherein the first linkage arm is pivotally coupled to a third linkage arm coupled to the steering input device.

3. The steering input system of claim 2, wherein the second rotation axis coincides with the pivotal connection between the first linkage arm and the third linkage arm.

4. The steering input system of claim 3, wherein the third linkage arm is arranged generally parallel with the second linkage arm.

5. The steering input system of claim 3, wherein the first positioning actuator is connected to the first linkage arm a distance away from the pivotal connection between the first linkage arm and the third linkage arm.

6. The steering input system of claim 1, comprising a fourth linkage arm, wherein a first end portion of the fourth linkage arm is connected to the second linkage arm at the second rotation axis, wherein the second positioning actuator is connected to the second linkage arm at a first end portion of the second positioning actuator, wherein the second end portion of the second positioning actuator is connected to a second end portion of the fourth linkage arm.

7. The steering input system of claim 6, wherein the steering input device is rotatable about a third rotation axis provided by a pivotal connection between the second end portion of the fourth linkage arm and a vehicle structure.

8. The steering input system of claim 1, wherein the steering input device is coupled to a spindle which is connected to a steering feedback system via a pivotal connection.

9. The steering input system of claim 8, wherein the spindle comprises an energy absorptions unit configured to absorb energy in the event of a vehicle collision.

10. The steering input system of claim 9, wherein the energy absorptions unit comprises a magnetorheological fluid-damper.

11. The steering input system of claim 1, wherein the steering input device is rotatably connected to the actuator assembly such that the steering input device is rotatable with respect to the actuator assembly such that a driver can provide steering input to the steering input system.

12. The steering input system of claim 1, comprising a control unit configured to receive input signals indicative of a desired position of the steering input device, and to control the actuators to reposition the steering input device according to the input signals.

13. The steering input system of claim 1, wherein the actuators are linear actuators.

14. A vehicle comprising the steering input system of claim 1.

15. The vehicle of claim 14, wherein the vehicle is an autonomous vehicle.

16. The vehicle of claim 14, operable in an autonomous mode and in a manual mode.

17. A control unit configured to control the actuators of the steering input system of claim 1.

18. The control unit of claim 17, configured to receive input signals indicative of a desired position of the steering input device, and to control the actuators to reposition the steering input device according to the input signals.

19. The control unit of claim 17, wherein when the control unit receives a control signal indicative of a selected autonomous mode, the control unit is configured to control the steering input device to transition to the retracted position.

20. The control unit of claim 17, wherein when the control unit receives a control signal indicative of a selected manual mode, the control unit is configured to control the steering input device to transition to the drive position.

* * * * *